(12) United States Patent
Riva Reggiori et al.

(10) Patent No.: US 12,714,147 B2
(45) Date of Patent: Aug. 25, 2026

(54) ELECTRONIC DEVICE WITH MOVABLE BATTERY HEATING CONFIGURATION

(71) Applicant: Philip Morris Products S.A., Neuchatel (CH)

(72) Inventors: Riccardo Riva Reggiori, Neuchatel (CH); Alexandra Sereda, Neuchatel (CH); Serge Lopez, Neuchatel (CH); Edward Branham, Neuchatel (CH); Matthew Lawrenson, Mannheim (DE)

(73) Assignee: Philip Morris Products S.A., Neuchatel (CH)

( * ) Notice: Subject to any disclaimer, the term of this patent is extended or adjusted under 35 U.S.C. 154(b) by 820 days.

(21) Appl. No.: 18/005,213

(22) PCT Filed: Jul. 12, 2021

(86) PCT No.: PCT/EP2021/069338
§ 371 (c)(1),
(2) Date: Jan. 12, 2023

(87) PCT Pub. No.: WO2022/013152
PCT Pub. Date: Jan. 20, 2022

(65) Prior Publication Data

US 2023/0263230 A1 Aug. 24, 2023

(30) Foreign Application Priority Data

Jul. 14, 2020 (EP) .................................... 20185628

(51) Int. Cl.
*A24F 40/465* (2020.01)
*H01M 10/615* (2014.01)
(Continued)

(52) U.S. Cl.
CPC ......... *A24F 40/465* (2020.01); *H01M 10/615* (2015.04); *H01M 10/623* (2015.04);
(Continued)

(58) Field of Classification Search
CPC .. H01M 10/63; H01M 10/615; H01M 10/425; H05B 6/105; A24F 40/46
See application file for complete search history.

(56) References Cited

U.S. PATENT DOCUMENTS

2010/0062321 A1 3/2010 Nakamura
2016/0050975 A1 * 2/2016 Worm .................. A61M 15/06 131/328
(Continued)

FOREIGN PATENT DOCUMENTS

CN 104955508 A 9/2015
CN 108783611 A * 11/2018 ........... A24F 47/008
(Continued)

OTHER PUBLICATIONS

Japanese Office Action issued Feb. 1, 2024 in Application No. 2023-501890, citing documents 15, 16 and 17 therein. 3 pages.
(Continued)

*Primary Examiner* — Thien S Tran
(74) *Attorney, Agent, or Firm* — Oblon, McClelland, Maier & Neustadt, L.L.P.

(57) ABSTRACT

An aerosol-generating device is provided, including: a battery, and a heater configured to heat the battery, in which one or both of the battery and the heater are movably mounted in the aerosol-generating device, such that the battery and the heater are relatively movable towards each other between a near position and a distanced position, the near position being different from the distanced position. An aerosol-generating system including an aerosol-generating article and the aerosol-generating device, and a method for heating a battery in the aerosol-generating device, are also provided.

15 Claims, 6 Drawing Sheets

(51) Int. Cl.

| | |
|---|---|
| ***H01M 10/623*** | (2014.01) |
| ***H01M 10/6571*** | (2014.01) |
| ***H05B 6/10*** | (2006.01) |

(52) U.S. Cl.

CPC ........ *H01M 10/6571* (2015.04); *H05B 6/105* (2013.01); *H01M 2220/30* (2013.01)

(56) References Cited

U.S. PATENT DOCUMENTS

| | | | | |
|---|---|---|---|---|
| 2017/0354185 | A1 | 12/2017 | Santos | |
| 2018/0289906 | A1* | 10/2018 | Trzecieski | A24F 40/40 |
| 2019/0320717 | A1 | 10/2019 | Tabasso et al. | |
| 2020/0171266 | A1* | 6/2020 | Trzecieski | A61M 11/041 |
| 2020/0337378 | A1* | 10/2020 | Doyle | A24F 40/60 |

FOREIGN PATENT DOCUMENTS

| | | | | |
|---|---|---|---|---|
| CN | 110248561 | A | 9/2019 | |
| CN | 110946330 | A | 4/2020 | |
| CN | 110996696 | A | 4/2020 | |
| CN | 111067141 | A | 4/2020 | |
| CN | 111278308 | A | 6/2020 | |
| CN | 211794339 | U | 10/2020 | |
| EA | 032410 | B1 | 5/2019 | |
| EP | 3 610 745 | B1 | 2/2024 | |
| GB | 2 125 156 | A | 2/1984 | |
| JP | 2000-323186 | A | 11/2000 | |
| JP | 2012-079441 | A | 4/2012 | |
| JP | 2019/519201 | A | 7/2019 | |
| JP | 2019-525737 | A | 9/2019 | |
| KR | 10-2012-0104533 | A | 9/2012 | |
| KR | 10-2015-0143877 | | 12/2015 | |
| KR | 10-2019-0028718 | | 3/2019 | |
| KR | 10-2019-0045423 | | 5/2019 | |
| KR | 10-1994297 | B1 | 6/2019 | |
| KR | 10-2021-0121597 | | 10/2021 | |
| RU | 2 712 348 | C2 | 1/2020 | |
| WO | WO 2008/019672 | A1 | 2/2008 | |
| WO | WO 2019/077710 | A1 | 4/2019 | |
| WO | WO 2019/238812 | A1 | 12/2019 | |
| WO | WO-2020201701 | A1 * | 10/2020 | A24F 40/46 |

OTHER PUBLICATIONS

International Search Report & Written Opinion issued Oct. 22, 2021 in PCT/EP2021/069338, filed on Jul. 12, 2021, citing documents 1-2 and 15-16 therein, 13 pages.

Japanese Decision to Grant issued Aug. 26, 2024 in Japanese Patent Application No. 2023-501890, citing references 15-19 therein, 2 pages.

Russian Search Report issued Jun. 5, 2023 in Russian Patent Application No. 2023100555/03 (with English Translation), citing references 15-19 therein, 4 pages.

Combined Chinese Office Action and Search Report issued Jan. 15, 2026, in corresponding Chinese Patent Application No. 202180043212.6 (with English Translation and English Translation of Category of Cited Documents) citing documents 1-6 therein, 12 pages.

Notice of Allowance issued on Feb. 23, 2026 in Korean Patent Application No. 10-2023-7000153 (with unedited computer-generated English translation), citing documents 1-4 therein, 5 pages.

* cited by examiner

Figure 1a
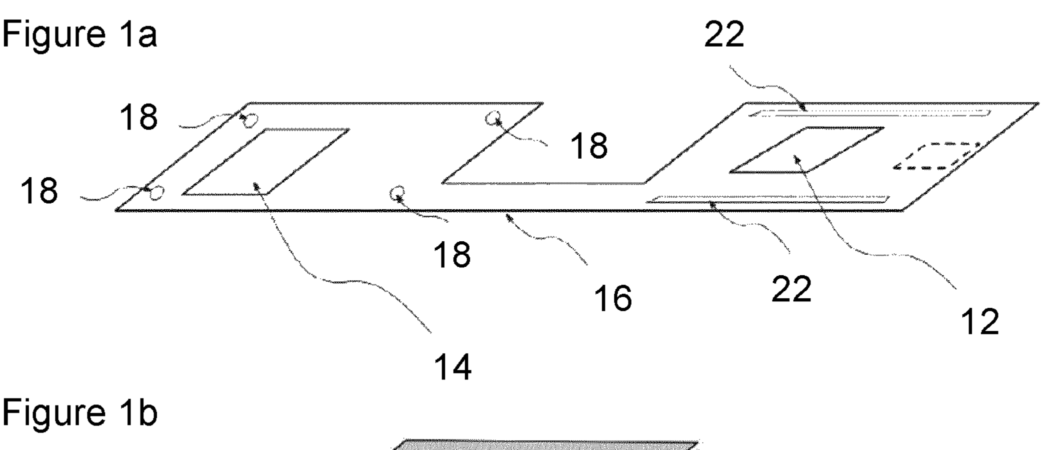
Figure 1b
16
14
Figure 1c
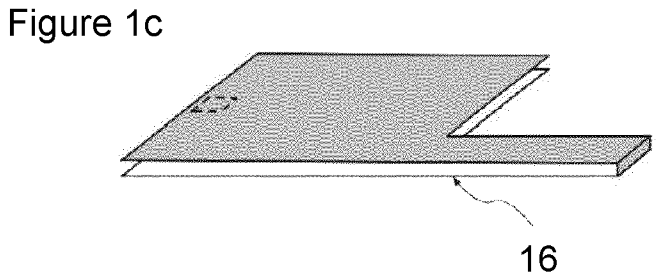

ELECTRONIC DEVICE WITH MOVABLE BATTERY HEATING CONFIGURATION

The present disclosure relates to an electronic device such as an aerosol-generating device. The present disclosure further relates to an aerosol-generating system comprising an aerosol-generating device and an aerosol-generating article. The present disclosure further relates to a method for heating a battery in an electronic device.

It is known to provide an electronic device which utilizes a battery for a power supply. It is known to provide an aerosol-generating device for generating an inhalable vapor which utilizes a battery for a power supply. Such devices may heat an aerosol-forming substrate to a temperature at which one or more components of the aerosol-forming substrate are volatilized without burning the aerosol-forming substrate. The aerosol-generating article may have a rod shape for insertion of the aerosol-generating article into a cavity, such as a heating chamber, of the aerosol-generating device. A heating element may be arranged in or around the heating chamber for heating the aerosol-forming substrate once the aerosol-generating article is inserted into the heating chamber of the aerosol-generating device. The power required for heating the aerosol-forming substrate may be provided by a battery.

It is known that the operation of batteries, for example lithium-ion batteries, is problematic at low temperatures. It also known that the storage of batteries, for example lithium-ion batteries, is problematic at low temperatures. Low temperatures may be temperatures below a range of 0 degree Celsius to 5 degree Celsius. At low temperatures, both capacity and voltage of a battery may be reduced. Such a situation may render an electronic device being powered by a battery inoperable at low temperatures. Also, between operations, when the device is not in use, both capacity and voltage of the battery may be reduced in a low temperature environment. Also, charging of a rechargeable battery in an electronic device at low temperatures may damage the battery.

It is known to include additional heaters in electronic devices to heat the batteries and thus prevent the batteries from being too cold. Generally, including an additional heater requires various additional components to be included into the device. Including additional components may negatively lead to higher costs of a device. Including additional components may lead to the device becoming heavier. It may be uncomfortable for a user to carry a heavy device. Including additional heater components may lead to the device inadvertently becoming bigger. It may be uncomfortable for a user to carry a big device. Also, if the device has multiple inductive circuits, and the various inductors are layered close to each other, their mutual inductance may reduce their effectiveness.

It is also known that the operation of batteries is problematic at too high temperatures. The longevity of a battery, for example a lithium-ion battery, may be adversely affected when the battery is exposed to too high temperatures. A battery which is unchangingly heated by an additional heater during use may be exposed to too high temperatures.

It would be desirable to have an electronic device which may prevent the battery from being too cold during operation. It would be desirable to have an electronic device that utilizes existing components already included in the device for battery heating. It would be desirable to have an electronic device that is kept light to be comfortable for a user to carry. It would be desirable to have an electronic device that is kept small to be comfortable for a user to carry. It would be desirable to have an electronic device that may avoid unchangingly heating the battery up to adversely high temperatures.

According to an embodiment of the invention there is provided an electronic device comprising a battery and a heater for heating the battery. One or both of the battery and the heater may be movably mounted in the device. The battery and the heater may be relatively movable towards each other between a near position and a distanced position, wherein the near position may be different from the distanced position.

According to an embodiment of the invention there is provided an electronic device comprising a battery and a heater for heating the battery. One or both of the battery and the heater are movably mounted in the device. The battery and the heater are relatively movable towards each other between a near position and a distanced position, wherein the near position is different from the distanced position.

By providing the battery and the heater relatively movable towards each other between a near position and a distanced position, the heater may be configured for heating the battery in the near position. In the near position, the heater may be in thermal contact, particularly in sufficient thermal contact, with the battery such that the heater may heat the battery. In the distanced position, the heater may be thermally insulated, particularly sufficiently thermal insulated, from the battery such that the heater will, at least not significantly, heat the battery. The amount of heat transferred from the heater to the battery in the near position may exceed the amount of heat transferred from the heater to the battery in the distanced position.

Due to providing the battery and the heater relatively movable towards each other between a near position and a distanced position, a disadvantageously cold battery may be heated to a desired temperature by moving to the near position. In the near position, a disadvantageously cold battery may be heated to a desired temperature during operation of the device. In the near position, a disadvantageously cold battery may be heated to a desired temperature between operations of the device. Due to providing the battery and the heater relatively movable towards each other between a near position and a distanced position, excessive heating of the battery may be prevented by moving to the distanced position. Due to providing the battery and the heater relatively movable towards each other between a near position and a distanced position, existing components of the device may be utilized for heating the battery. Implementation of an extra battery heater into the device may be avoided. Production costs may be saved. The device may be designed one or both of smaller and more lightweight. Portability and convenience of the device may be improved.

The battery may be configured as a power supply for powering one or more functions of the electronic device. The battery may be configured as a power supply for powering the heater for heating the battery. The battery may be any type of battery as described herein.

The electronic device may comprise a thermally insulating element configured for reducing the thermal contact between the heater the battery in the distanced position. The thermally insulating element may be spatially positioned between the heater and the battery in the distanced position. The thermally insulating element may comprise a thermally insulating material like fiberglass, polystyrene, polyurethane foam, or other thermally insulating materials generally known to those skilled in the art. The thermally insulating element may have a relatively flat, rectangular or disc-like shape. The thermally insulating element may comprise an opening. The opening may be an opening between two opposing sides of the thermally insulating element. The opening may comprise a re-closable door. The opening may comprise a slot. One or both of the battery and the heater may be moved through the opening, when the battery and the heater being relatively moved towards each other between the near position and the distanced position. In the near position, the battery and the heater may be located at the same side of the thermally insulating element. In the distanced position, the battery and the heater may be located at opposite sides of the thermally insulating element.

One or both of the battery and the heater may be mounted on a flexible substrate. The use of a flexible substrate may allow the movement of components to take place easily within a device. This movement may be free in three dimensions or may be constrained by physical structures to movement within a plane, or further constrained to movement along a line. The movement may allow the spacing between components to be varied. Some components mounted or printed on the flexible substrate may also be flexible, for example, wires or tracks may be bent, allowing components to remain in electrical contact even when their relative location is changed. A flexible substrate may be utilized to change the relative location of components within an electronic device and, therefore, to allow a battery to receive heating in some circumstances and not receive heating in others.

The flexible substrate may further comprise control electronics of the device. The flexible substrate may be rolled into a tube. By rolling the flexible substrate into a tube, the flexible substrate assumes a tubular shape.

Both of the heating element and the control electronics may be printed on the flexible substrate, for example using metallic inks. During assembly, the flexible substrate comprising on or both of the battery and the heater can be brought into a desired shape, e.g. into a tubular shape, by rolling, due to the flexible nature of the substrate.

The flexible substrate may be electrically insulating. The flexible substrate may be a flexible dielectric substrate. The flexible substrate may comprise polyimide. The flexible substrate may consist of polyimide. The flexible substrate may comprise any suitable material, and is preferably a material that is able to tolerate high temperatures, such as temperatures in the range 150 degrees Celsius to 250 degrees Celsius, or in the range from 250 degrees Celsius to 350 degrees Celsius, and rapid temperature changes. An example of a suitable material is a polyimide film, such as Kapton®.

Individual portions of the flexible substrate can be folded to lie on top of each other before being rolled into a tube. This layered arrangement of the individual portions may be made easier and optimally using the available space, if the individual portions have a similar or the same shape. A first portion of the flexible substrate may be arranged at least partly coaxially surrounding the outer perimeter of a second portion of the flexible s substrate. After being rolled into a tube, the first and second portions of the flexible substrate may have a hollow tubular shape. In one embodiment, the flexible substrate is laminated before being rolled into a tube.

The coaxial arrangement of the first portion of the flexible substrate with respect to the outer perimeter of the second portion of the flexible substrate may create a compact arrangement, for example a compact heater. The compact heater may be arranged around the cavity of the aerosol-generating device for heating the aerosol-forming substrate of the aerosol-generating article received in the cavity.

The flexible substrate may have a thickness of between 0.02 millimeters to 4.50 millimeters, preferably between 0.035 millimeters to 2.75 millimeters.

The flexible substrate may comprise a movable portion. The movable portion may be movably mounted in the device. The flexible substrate may comprise a fixed portion. The fixed portion may be fixedly mounted in the device. The movable portion may be relatively movable with respect to the fixed portion. A component may be fixedly mounted in the device by being mounted to the fixed portion of the flexible substrate. One of the first and second portions of the flexible substrate may be a movable portion and the other portion may be a fixed portion. The movable portion and the fixed portion of the flexible substrate may be integrally formed. Thus, the movable portion and the fixed portion of the flexible substrate may be individual portions of a single flexible substrate.

The flexible substrate may be in form of a folded sheet. The folded sheet may comprise a first layer overlying a second layer. The first layer may be fixedly mounted to a body of the device and may thus comprise the fixed portion. The second layer may comprise the movable portion.

The movable portion may comprise slots. The slots may engage with corresponding sliding supports thus allowing a linear movement of the movable portion.

The movable portion may be movably mounted to the body of the device by means of a sliding support.

The movable portion may comprise a sliding fixture for a user to manually move the movable portion. The sliding fixture may be slidably movable along a longitudinal axis of the electronic device.

The movable portion may comprise a motor for automatically moving the movable portion. The motor may be one or both of an electric motor and a linear motor.

The electronic device may comprise a temperature sensor. The temperature sensor may sense one or both of the temperature of the environment of the electronic device and the temperature of the battery. The temperature sensor may sense the temperature of another component of the device. The temperature of another component of the device may be used to estimate the temperature of the battery.

The device may be configured to relatively move the battery and the heater towards each other between the near position and the distanced position in response to a temperature sensed by the temperature sensor. The device may comprise a controller configured to receive and process a temperature signal of the temperature sensor. The controller may send a signal to the motor to relatively move the battery and the heater towards each other between the near position and the distanced position based on the signal received from the temperature sensor.

The electronic device may comprise a temperature sensitive element configured for relatively moving the battery and the heater between the near position and the distanced position. The temperature sensitive element may be configured for automatically relatively moving the battery and the heater between the near position and the distanced position.

The temperature sensitive element may comprise a temperature-responsive element which may change its shape or dimension in response to a change in temperature. The battery and the heater may be relatively moved between the near position and the distanced position by the change of shape or dimension of the temperature-responsive element. By using a temperature-responsive element, the battery and the heater may be automatically relatively moved between the near position and the distanced in dependence of the temperature of the temperature-responsive element. By using a temperature-responsive element, the battery and the heater may be automatically relatively moved between the near position and the distanced in dependence of the temperature without the need of a separate temperature sensor. The temperature responsive element may comprise a bimetallic strip.

The temperature sensitive element may comprise a temperature sensor and an actuator. The temperature sensitive element may be a temperature sensor as described herein. The temperature sensor may sense the temperature of the battery. The actuator may comprise a motor. The motor may be one or both of an electric motor and a linear motor. The output of the temperature sensor may be received by a controller. The controller may be included into a main control unit of the device or may be a separate controller of the temperature sensitive element. The controller may be configured to operate the actuator. The actuator may be controlled in dependence of a signal received from the controller. The signal of the controller may depend upon the received output of the temperature sensor. The controller may be configured to operate the actuator in dependence of the temperature signal the controller receives from the temperature sensor. The actuator may operate to relatively move the battery and the heater between the near position and the distanced position in dependence of a temperature measured by the temperature sensor. When the temperature measured by the temperature sensor is below a pre-set minimum value, the actuator may relatively move the battery and the heater in the near position to heat the battery. When the temperature measured by the temperature sensor exceeds a pre-set maximum value, the actuator may relatively move the battery and the heater in the distanced position to not heat the battery.

The device may comprise a timer configured for automatically relatively moving the battery and the heater between the near position and the distanced position based on a pre-set time interval. The pre-set time interval may begin with the device being switched on. When the device is being switched on the battery and heater may be relatively moved into the near position such that the battery may be initially heated to a working temperature. After a pre-set time interval the battery and heater may be relatively moved into the distanced position.

One of the battery and the heater may be mounted on the movable portion of the flexible substrate such that the battery and the heater are relatively movable towards each other by movement of the movable portion. One of the battery and the heater may be mounted on the movable portion of the flexible substrate and the other one of the battery and the heater may be mounted on the fixed portion of the flexible substrate such that the battery and the heater are relatively movable towards each other by movement of the movable portion.

The heater may be an inductive heater comprising an induction coil and a susceptor, the battery may be fixedly mounted to a body of the device, and one or both of the induction coil and the susceptor may be mounted on the movable portion.

The heater may be an inductive heater comprising an induction coil and a susceptor, the induction coil may be fixedly mounted to a body of the device, the battery may be mounted on the movable portion, and the susceptor may be mounted on the battery or the induction coil.

The heater may be an inductive heater comprising an induction coil and a susceptor, the device may further comprise a heating chamber in thermal contact with an additional susceptor, and the heater may be configured for heating the heating chamber in the distanced position. The heating chamber may be heated by heating the additional susceptor.

The flexible substrate may have a hollow cylindrical shape. The flexible substrate may circumscribe a cavity of the electronic device. The cavity may be a heating chamber.

One or both of the heater and the battery may have a hollow cylindrical shape. The battery and the heater may be coaxially aligned.

One or both of the heater and the battery may be movably mounted along a longitudinal axis of the electronic device. A longitudinal axis of the electronic device may be parallel to one or both of a longitudinal axis of the heater and the battery. A longitudinal axis of the battery may be parallel to a longitudinal axis of the heater. The electronic device may comprise a cylindrical heating chamber and one or both of the heater and the battery may be movably mounted along a longitudinal axis of the heating chamber.

The heater may be an electrical heater. The heater may be one or both of a resistive heater and an inductive heater. An inductive heater may comprise an induction coil and a susceptor. The heater may comprise one or more heating elements.

The heating element may be formed from one or more resistive heating tracks. The heating element may consist of resistive heating tracks. The resistive heating tracks may be provided on the flexible substrate. The resistive heating tracks may be printed on the flexible substrate, for example using metallic inks. The resistive heating tracks may comprise a single resistive heating track. Alternatively, the resistive heating track may comprise at least two resistive heating tracks. The resistive heating tracks may act as an electrically resistive heater.

The resistive heating tracks may have a temperature coefficient of resistance characteristics such that the resistive heating tracks may act as both a resistive heater and as a temperature sensor.

The heating element, preferably in the form of resistive heating tracks, may be electrically connected to a power supply. The heating element may comprise a plurality of portions. If the heating element is provided in the form of resistive heating tracks, the resistive heating tracks may comprise a plurality of portions or a plurality of resistive heating tracks. Each portion of the heating element may be separately connectable to the power supply. This provides a number of advantages. First, it allows the different portions to be heated for different durations, which may enhance the smoking experience, depending on the nature of the aerosol-forming substrate. Second, it allows the different portions to be heated at different temperatures, which may also enhance the smoking experience, depending on the nature of the aerosol-forming substrate. Third, it allows a particular portion of the heater to be activated at any one time. This allows only a portion of the aerosol-forming substrate to be heated at any one time.

The heater may comprise a power supply. The power supply is preferably configured as a battery. The power supply of the heater may be the battery which is heated by the heater or a different power supply. The power supply may be provided on the flexible substrate. The power supply may be configured as a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery. As an alternative, the power supply may be another form of charge storage device such as a capacitor. The power supply may require recharging and may have a capacity that enables to store enough energy for one or more usage experiences; for example, the power supply may have sufficient capacity to continuously generate aerosol for a period of around six minutes or for a period of a multiple of six minutes. In another example, the power supply may have sufficient capacity to provide a predetermined number of puffs or discrete activations of the heater.

The power supply may be flat. The power supply may be a flat battery. The power supply may be flexible. The power supply may be a flexible battery. The power supply may be a flat and flexible battery. The power supply may be provided as a flexible flat sheet on the flexible substrate.

The heating element may comprise an induction coil. The heating element may comprise at least two induction coils. The induction coil may be electrically connected to the power supply. The controller electronics may be configured to control the supply of electrical energy from the power supply to the induction coil. The induction coil may be configured to generate an alternating magnetic field. The induction coil may be provided relatively movable with respect to the battery.

The heater may further comprise a susceptor. The heater may comprise a susceptor for heating the battery. The susceptor may be mounted on the battery. The susceptor may be provided as an outer layer of the battery. The susceptor may be provided relatively movable with respect to the battery. The heater may comprise a susceptor for heating the battery and an additional susceptor for performing a different heating function. The heater may comprise a susceptor for heating the battery and an additional susceptor for heating an aerosol-forming substrate.

The susceptor may be flat. The susceptor may be flexible. The susceptor may be provided as a flexible flat sheet on the flexible substrate. The susceptor may be provided on a movable portion of the flexible substrate.

In general, a susceptor is a material that is capable of absorbing electromagnetic energy and converting it to heat. When located in an alternating magnetic field. If the susceptor is conductive, then typically eddy currents are induced by the alternating magnetic field. If the susceptor is magnetic, then typically another effect that contributes to the heating is commonly referred to hysteresis losses. Hysteresis losses occur mainly due to the movement of the magnetic domain blocks within the susceptor, because the magnetic orientation of these will align with the magnetic induction field, which alternates. Another effect contributing to the hysteresis loss is when the magnetic domains will grow or shrink within the susceptor. Commonly all these changes in the susceptor that happen on a nano-scale or below are referred to as “hysteresis losses”, because they produce heat in the susceptor. Hence, if the susceptor is both magnetic and electrically conductive, both hysteresis losses and the generation of eddy currents will contribute to the heating of the susceptor. If the susceptor is magnetic, but not conductive, then hysteresis losses will be the only means by which the susceptor will heat, when penetrated by an alternating magnetic field. According to the invention, the susceptor may be electrically conductive or magnetic or both electrically conductive and magnetic. An alternating magnetic field generated by one or several induction coils heat the susceptor, which then transfers the heat to one or both of the battery and the aerosol-forming substrate, such that an aerosol is formed. The heat transfer may be mainly by conduction of heat. Such a transfer of heat is best, if the susceptor is in close thermal contact with one or both of the battery and the aerosol-forming substrate.

The susceptor may be formed from any material that can be inductively heated to a temperature sufficient to one or both of heating the battery and generating an aerosol from the aerosol-forming substrate. A preferred susceptor may comprise or consist of a ferromagnetic material or ferrimagnetic material, for example a ferromagnetic alloy, ferritic iron, or a ferromagnetic steel or stainless steel. A suitable susceptor may be, or comprise, aluminium. Preferred susceptors may be heated to a temperature in excess of 250 degrees Celsius.

Preferred susceptors are metal susceptors, for example stainless steel. However, susceptor materials may also comprise or be made of graphite, molybdenum, silicon carbide, aluminum, niobium, Inconel alloys (austenite nickel-chromium-based superalloys), metallized films, ceramics such as for example zirconia, transition metals such as for example iron, cobalt, nickel, or metalloids components such as for example boron, carbon, silicon, phosphorus, aluminium.

Preferably, the susceptor material is a metallic susceptor material (by metallic is meant a metal in a non-oxide form, which usually is referred to as ceramics). The susceptor may also be a multi-material susceptor and may comprise a first susceptor material and a second susceptor material. In some embodiments, the first susceptor material may be disposed in intimate physical contact with the second susceptor material. The first and/or second susceptor material preferably has a Curie temperature that is below the combustion temperature of the aerosol-forming substrate. The first susceptor material is preferably used primarily to heat the susceptor when the susceptor is placed in a fluctuating electromagnetic field. Any suitable material may be used. For example, the first susceptor material may be aluminium, or may be a ferrous material such as a stainless steel. The second susceptor material is preferably used primarily to indicate when the susceptor has reached a specific temperature, that temperature being the Curie temperature of the second susceptor material.

The Curie temperature of the second susceptor material can be used to regulate the temperature of the entire susceptor during operation. Suitable materials for the second susceptor material may include nickel and certain nickel alloys.

By providing a susceptor having at least a first and a second susceptor material, the heating of the aerosol-forming substrate and the temperature control of the heating may be separated. Preferably, the second susceptor material is a magnetic material having a second Curie temperature that is substantially the same as a desired maximum heating temperature. That is, it is preferable that the second Curie temperature is approximately the same as the temperature that the susceptor should be heated to in order to generate an aerosol from the aerosol-forming substrate.

By the term “Curie temperature” is generally understood as the temperature at, which a magnetic material loses its magnetic properties in the absence of an external magnetic field. Hence, the Curie temperature is a temperature at which a ferro- or ferri-magnetic material undergoes a phase change and becomes paramagnetic.

When an induction heating element is employed, the induction heating element may be configured as an external heater as described herein. If the induction heating element is configured as an external heating element, the susceptor element is preferably configured as a cylindrical susceptor at least partly surrounding the cavity or forming the sidewall of the cavity.

The heater may comprise a finishing layer of laminated material that is arranged at least partly covering the heater.

The finishing layer may be configured as the outer layer of the heater. The finishing layer may be configured to protect the heater. The finishing layer may be configured fully covering the outer perimeter of the heater. The finishing layer may be configured to enhance one or more of ultra-violet resistance, infrared resistance, printability of branding, overall external design colouring, texture, mechanical resistance, chemical resistance, and other characteristics of the heater as required. The finishing layer may be configured as a wrapper. The finishing layer may be wrapped around the heater.

The heater may be configured for performing at least one additional function in addition to heating the battery in one or both of the near position and the distanced position. The additional function may be an additional heating function.

The electronic device may be an aerosol-generating device. The electronic device may be an aerosol-generating device and the heater may be further configured for heating an aerosol-generating article in one or both of the near position and the distanced position.

The invention further relates to an aerosol-generating device comprising a cavity configured for receiving an aerosol-generating article comprising aerosol-forming substrate. The aerosol-generating device further comprises the heater as described herein. The heater may be arranged at least partly coaxially surrounding the outer perimeter of the cavity.

The heater may be configured for heating the aerosol-forming substrate of the aerosol-generating article, when the aerosol-generating article is received in the cavity. To optimize heat transfer from the heater to the aerosol-forming substrate, the heater may be arranged at least partly coaxially surrounding the outer perimeter of the cavity. In this way, the heat can be transferred to the aerosol-forming substrate in a radial inward direction. Preferably, the heater is arranged fully coaxially surrounding the outer perimeter of the cavity.

The battery may serve as the power supply for the aerosol-generating device. The control electronics of the heater may be configured to control the supply of electrical energy from the power supply of the aerosol-generating device to the heating element of the heater. As a further alternative, the heater may comprise the battery and the aerosol-generating device may comprise an additional power supply, preferably an additional battery. The control electronics of the heater may be configured to control the supply of electrical energy from the power supply of the heater and from the additional power supply of the aerosol-generating device to the heating element of the heater. Further to the control electronics of the heater, the aerosol-generating device may comprise a controller. The control electronics of the heater may be configured to control the supply of electrical energy from the power supply of the heater to the heating element. The controller of the aerosol-generating device may be configured to control the supply of electrical energy from the additional power supply of the aerosol-generating device to the heating element of the heater.

The aerosol-generating device may comprise a main body. One or both of the additional power supply and the controller of the aerosol-generating device may be arranged in the main body. The aerosol-generating device may comprise a mouth end portion. The cavity may be arranged in the mouth end portion. The mouth end portion may be integrally formed with the main body. Alternatively, the mouth end portion may be configured removably attachable to the main body. The mouth end portion may comprise a mouthpiece. The mouthpiece may be configured to cover the cavity. Exemplarily, the mouthpiece may be connected with the mouth end portion by a hinge connection. Alternatively, the mouthpiece may be removably attachable to the mouth end portion of the aerosol-generating device. As a further alternative, no mouthpiece is provided and a user directly draws on a proximal end of the aerosol-generating article received in the cavity of the mouth end portion.

The heater may at least partly form a sidewall of the cavity. Heat transfer may be optimized by the heater at least partly forming the sidewall. The heater may fully form the sidewall of the cavity.

As used herein, an 'aerosol-generating device' relates to a device that interacts with an aerosol-forming substrate to generate an aerosol. The aerosol-forming substrate may be part of an aerosol-generating article, for example part of a smoking article. An aerosol-generating device may be a smoking device that interacts with an aerosol-forming substrate of an aerosol-generating article to generate an aerosol that is directly inhalable into a user's lungs thorough the user's mouth. An aerosol-generating device may be a holder. The device may be an electrically heated smoking device. The aerosol-generating device may comprise a housing, electric circuitry, a power supply, a heating chamber and a heating element.

The invention further relates to a system comprising the aerosol-generating device as described herein and an aerosol-generating article comprising aerosol-forming substrate.

As used herein, the term 'aerosol-generating article' refers to an article comprising an aerosol-forming substrate that is capable of releasing volatile compounds that can form an aerosol. For example, an aerosol-generating article may be a smoking article that generates an aerosol that is directly inhalable into a user's lungs through the user's mouth. An aerosol-generating article may be disposable.

The aerosol-generating article may be substantially cylindrical in shape. The aerosol-generating article may be substantially elongate. The aerosol-generating article may have a length and a circumference substantially perpendicular to the length. The aerosol-generating article may be substantially rod shaped. The aerosol-forming substrate may be substantially cylindrical in shape. The aerosol-forming substrate may be substantially elongate. The aerosol-forming substrate may also have a length and a circumference substantially perpendicular to the length. The aerosol-forming substrate may be substantially rod shaped.

The aerosol-generating substrate may comprise an aerosol-former. The aerosol-generating substrate preferably comprises homogenised tobacco material, an aerosol-former and water. Providing homogenised tobacco material may improve aerosol generation, the nicotine content and the flavour profile of the aerosol generated during heating of the aerosol-generating article. Specifically, the process of making homogenised tobacco involves grinding tobacco leaf, which more effectively enables the release of nicotine and flavours upon heating.

The invention further relates to a method for heating a battery in an electronic device. The method comprises providing an electronic device as described herein. The method further comprises relatively moving the battery towards the heater from the distanced position into the near position to heat the battery.

The invention further relates to a method for operating an aerosol-generating device as described herein. The method comprises relatively moving the battery towards the heater from the distanced position into the near position to heat the battery. The method may further comprise relatively moving the battery away from the heater from the near position into the distanced position to heat an aerosol-forming substrate.

Below, there is provided a non-exhaustive list of non-limiting examples. Any one or more of the features of these examples may be combined with any one or more features of another example, embodiment, or aspect described herein.

Example A: An electronic device comprising a battery and a heater for heating the battery. One or both of the battery and the heater are movably mounted in the device, such that the battery and the heater are relatively movable towards each other between a near position in which the heater is in thermal contact with the battery and a distanced position in which the heater is thermally insulated from the battery.

Example B: An electronic device, comprising:

a battery, and a heater for heating the battery, wherein one or both of the battery and the heater are movably mounted in the device, such that the battery and the heater are relatively movable towards each other between a near position and a distanced position, wherein the near position is different from the distanced position.

Example C: The device according to claim 1, wherein the heater is further configured for performing at least one additional function, preferably an additional heating function, in one or both of the near position and the distanced position.

Example D: The device according to any of the preceding examples, wherein the device is an aerosol-generating device.

Example E: The device according to Example D, wherein the heater is further configured for heating an aerosol-generating article in one or both of the near position and the distanced position.

Example F: The device according to any of the preceding examples, wherein one or both of the battery and the heater are mounted on a flexible substrate.

Example G: The device according to Example F, wherein one of the battery and the heater are mounted on a movable portion of the flexible substrate such that the battery and the heater are relatively movable towards each other by movement of the movable portion.

Example H: The device according to claim Example G, wherein the heater is an inductive heater comprising an induction coil and a susceptor.

Example I: The device according to Example H, wherein the battery is fixedly mounted to a body of the device, and wherein one or both of the induction coil and the susceptor are mounted on the movable portion.

Example J: The device according to Example H, wherein the induction coil is fixedly mounted to a body of the device, wherein the battery is mounted on the movable portion, and wherein the susceptor is mounted on the battery or the induction coil.

Example K: The device according to Example H, further comprising a heating chamber in thermal contact with an additional susceptor, wherein the heater configured for heating the heating chamber in the distanced position.

Example L: The device according to any of Examples G to K, wherein the flexible substrate is in form of a folded sheet, the sheet comprising a first layer overlying a second layer, wherein the first layer is fixedly mounted to a body of the device, and wherein the second layer comprises the movable portion.

Example M: The device according to Example L, wherein the movable portion is movably mounted to the body of the device by means of a sliding support.

Example N: The device according to any of Examples G to M, wherein the movable portion comprises a sliding fixture for a user to manually move the movable portion.

Example O: The device according to any of Examples G to N, wherein the movable portion comprises a motor for automatically moving the movable portion, preferably, wherein the motor is one or both of an electric motor and a linear motor.

Example P: The device according to any one of the preceding examples, further comprising a temperature sensitive element configured for automatically relatively moving the battery and the heater between the near position and the distanced position.

Example Q: The device according to Example P, wherein the temperature sensitive element comprises a bimetallic strip.

Example R: The device according to Example Q, wherein the temperature sensitive element comprises a temperature sensor and an actuator.

Example S: The device according to Example R, wherein the actuator comprises a motor, preferably, wherein the motor is one or both of an electric motor and a linear motor.

Example T: The device according to any one of the preceding examples, further comprising a timer configured for automatically relatively moving the battery and the heater between the near position and the distanced position based on a pre-set time interval.

Example U: The device according to any of Examples F to T, wherein the flexible substrate has a hollow cylindrical shape.

Example V: The device according to claim U, wherein the flexible substrate circumscribes a cavity of the device, preferably, wherein the cavity is a heating chamber.

Example W: The device according to any of the preceding examples, wherein one or both of the heater and the battery have a hollow cylindrical shape.

Example X: The device according to Example W, wherein the battery and the heater are coaxially aligned.

Example Y: The device according to any of the preceding examples, wherein one or both of the heater and the battery are movably mounted along a longitudinal axis of the device.

Example Z: The device according to any of the preceding examples, wherein a longitudinal axis of the battery is parallel to a longitudinal axis of the heater.

Example ZA: An aerosol-generating system comprising an aerosol-generating article and a device according to any of the preceding examples, wherein the device is an aerosol-generating device.

Example ZB: A method for heating a battery in an electronic device comprising steps of:

providing an electronic device, comprising a battery and a heater for heating the battery, wherein one or both of the battery and the heater are movably mounted in the device, such that the battery and the heater are relatively movable towards each other between a near position and a distanced position, wherein the near position is different from the distanced position; and relatively moving the battery towards the heater from the distanced position into the near position to heat the battery.

Features described in relation to one embodiment may equally be applied to other embodiments of the invention.

The invention will be further described, by way of example only, with reference to the accompanying drawings in which:

FIGS. 1*a*-1*c* show different configurations of a battery and heater arrangement for an electronic device;

FIGS. 2*a* and 2*b* show different configurations of a battery and heater arrangement of an electronic device;

FIGS. 3*a* and 3*b* show different configurations of a battery and heater arrangement of an electronic device;

FIGS. 4*a* and 4*b* show different configurations of a battery and heater arrangement of an electronic device;

Figure 2A:
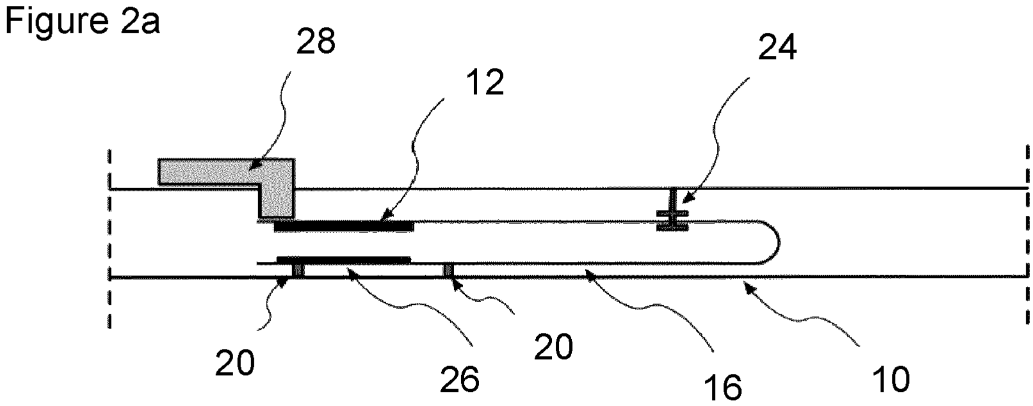

FIGS. 1*a*-1*c* show different configurations of a battery and heater arrangement for an electronic device.

FIG. 1 a shows a battery 12 and a heater 14 arranged on a flexible substrate 16. The flexible substrate 16 is in an un-folded configuration. The flexible substrate 16 further comprises a set of mounting points 18 which allow to fixedly mount a portion of the flexible substrate 16 to a body of the electronic device 10 via mounting joints 20 as exemplified in the embodiment of FIGS. 2*a* and 2*b*. The flexible substrate 16 further comprises slots 22 which allow to slidably mount a movable portion of the flexible substrate 16 to a body of the electronic device 10 via sliding supports 24 as exemplified in the embodiment of FIGS. 2*a* and 2*b*. When being mounted in an electronic device 10, the flexible substrate 16 is folded such that the battery 12 and the heater 14 are relatively movable towards each other between a near position and a distanced position as shown in FIG. 1*b* and FIG. 1*c*.

FIG. 1*b* shows the arrangement of FIG. 1*a* in a first folded configuration, wherein the battery 12 and the heater 14 are relatively moved into the distanced position.

FIG. 1*c* shows the arrangement in a second folded configuration, wherein the battery 12 and the heater 14 are relatively moved into the near position.

Figure 2B:
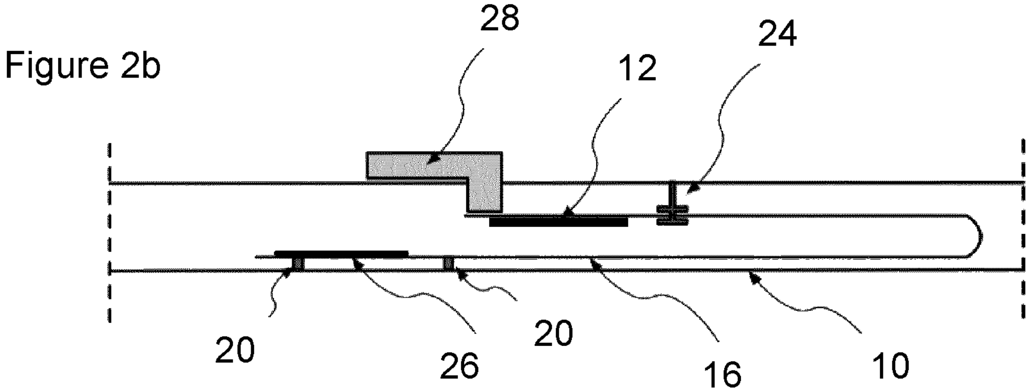

FIGS. 2*a* and 2*b* show different configurations of the battery and heater arrangement of FIGS. 1*a* to 1*c* being mounted into a body of an electronic device 10. The heater comprises a heating circuit 26. The heater may be a resistive heater and the heating circuit 26 may comprise a resistive heating element. The heater may be an inductive heater comprising an induction coil and a susceptor. The heating circuit 26 may include the induction coil. The susceptor may be mounted on the battery 12 or on the heating circuit 26.

The flexible substrate 16 is in form of a folded sheet, the sheet comprising a first layer overlying a second layer. The first layer comprises a fixed portion of the flexible substrate 16. The first layer is fixedly mounted to a body of the device 10 by means of mounting joints 20. The second layer comprises the movable portion of the flexible substrate 16. The second layer is movably mounted to the body of the device 10 by means of sliding supports 24. The movable portion comprises a sliding fixture 28 for a user to manually move the movable portion. The sliding fixture 28 protrudes through a slot in the body of the device 10. The battery 12 is mounted on the movable portion of the flexible substrate 16. A user may grasp the sliding fixture 28 for moving the movable portion of the flexible substrate 16. Thereby, the battery 12 may be moved towards the heating circuit 26 and into the near position, or the battery 12 may be moved away from the heating circuit 26 and into the distanced position. By a user moving the sliding fixture 28 it is possible to change the relative placement of the battery 12 and the heating circuit 26, and therefore change the amount of heat experienced by the battery 12.

FIG. 2*a* shows a configuration, wherein the battery 12 and the heating circuit 26 are moved into the near position. The battery is thus brought into close proximity to the heating circuit 26 comprising the heating element such that the battery 12 may be heated.

FIG. 2*b* shows a configuration, wherein the battery 12 and the heating circuit 26 are moved into the distanced position. The battery is thus brought further away from the heating circuit 26 comprising the heating element such that the battery 12 is not or not significantly heated even when the heating element is switched on. Thus, in the distanced position the heating element may be switched on for providing a different heating function without, at the same time, overheating the battery. The different heating function may be heating a heating chamber of the electronic device.

Figure 3A:
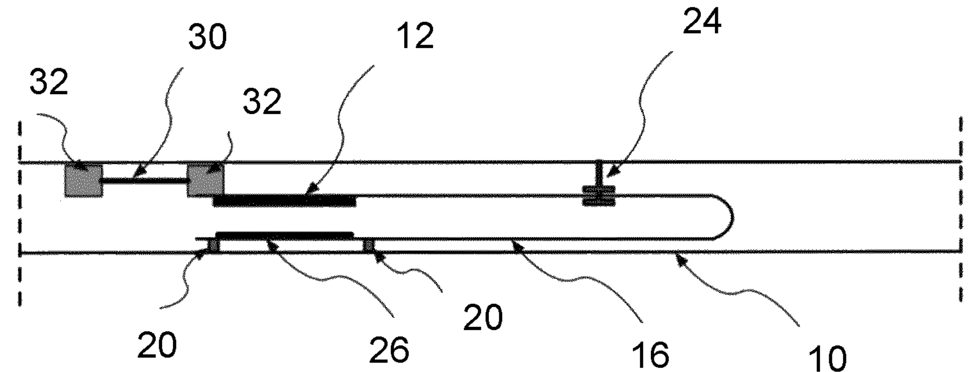
Figure 3B:
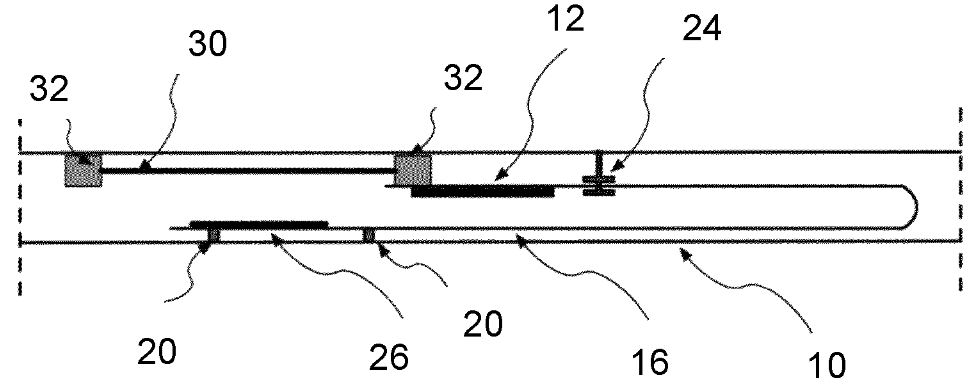

FIGS. 3*a* and 3*b* show different configurations of an embodiment of a battery and heater arrangement being mounted into a body of an electronic device 10. The embodiment of FIGS. 3*a* and 3*b* is similar to the embodiment of FIGS. 2*a* and 2*b*. However, the embodiment of FIGS. 3*a* and 3*b* does not comprise sliding fixture 28. Instead, a temperature-dependent actuation mechanism is utilized. The temperature-dependent actuation mechanism comprises a temperature sensitive element 30 configured for automatically relatively moving the battery and the heater between the near position and the distanced position. Opposite ends of the temperature sensitive element 30 are mounted to respective portions of the body of the device 10 and the movable portion of the flexible substrate 16 by means of respective attachment fixtures 32. The temperature sensitive element 30 comprises a temperature sensor and an actuator. The actuator comprises an electric linear motor to linearly move the movable portion of the flexible substrate 16. The output of the temperature sensor is received by a controller. The controller may be included into the main control unit of the device or may be a separate controller of the temperature sensitive element 30. The controller is configured to operate the actuator. The actuator is controlled in dependence of a signal received from the controller. The signal of the controller depends upon the received output of the temperature sensor. When the temperature sensor signals that the temperature of the battery is below a minimum working temperature, the actuator moves the movable portion of the flexible substrate 16 into the near position. When the temperature sensor signals that the temperature of the battery is above a maximum working temperature, the actuator moves the movable portion of the flexible substrate 16 into the distanced position. FIG. 3*a* shows a configuration, wherein the battery 12 and the heating circuit 26 are moved into the near position.

FIG. 3*b* shows a configuration, wherein the battery 12 and the heating circuit 26 are moved into the distanced position.

Figure 4A:
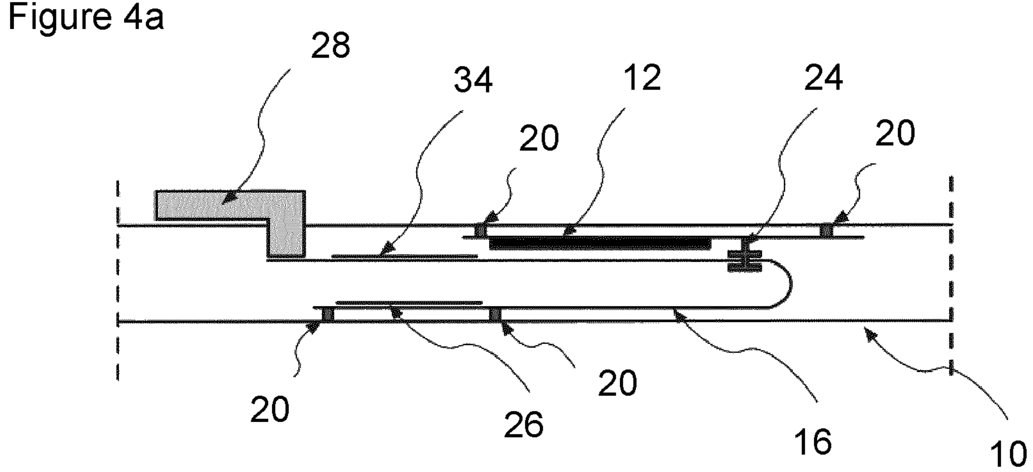
Figure 4B:
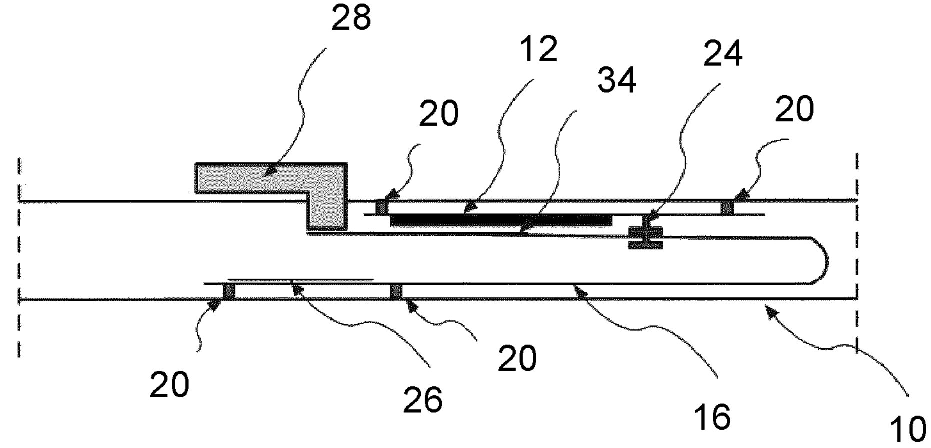

FIGS. 4*a* and 4*b* show different configurations of an embodiment of a battery and heater arrangement being mounted into a body of an electronic device 10. The heater is an inductive heater. The heating circuit 26 includes an induction coil. The susceptor 34 is mounted on the movable portion of the flexible substrate 16. The battery 12 is not mounted on the flexible substrate 16. Instead, the battery 12 is fixedly mounted to a different part of the body of the device 10 by mounting joints 20.

FIG. 4*a* shows a configuration, wherein the battery 12 and the susceptor 34 are moved into the distanced position. In the distanced position, the susceptor 34 is distanced from the battery 12 such that there is only little heat transfer from the susceptor 34 to the battery 12.

FIG. 4*b* shows a configuration, wherein the battery 12 and the susceptor 34 are moved into the near position. In the near position, the susceptor 34 is in close proximity to the battery 12 such that there is sufficient heat transfer from the susceptor 34 to the battery 12 to heat the battery 12 to a desired temperature.

Figure 5:
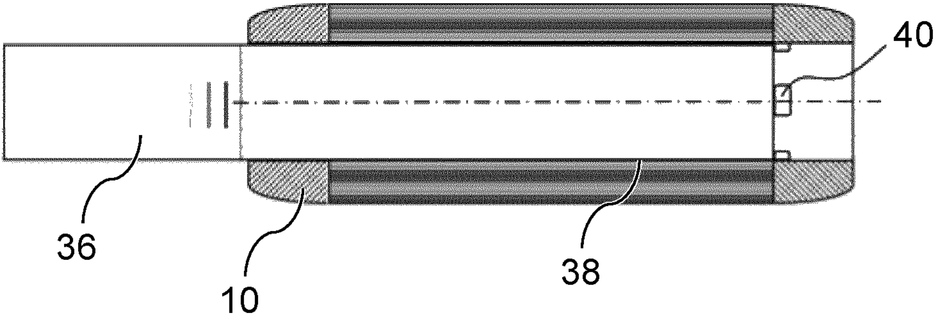
FIG. 5 shows an embodiment of an electronic device.

FIG. 5 shows an electronic device 10. The electronic device 10 is an aerosol-generating device. An aerosol-generating article 36 comprising an aerosol-forming substrate can be inserted into a cavity 38 of the aerosol-generating device. At the base of the cavity 38, stopper 40 are arranged. The stopper 40 are configured to prevent over-insertion of the aerosol-generating article 36 into the cavity 38.

The cavity 38 is a heating chamber of the device 10. A battery and heater arrangement, for example a battery and heater arrangement as shown in any of FIGS. 1 to 4, is arranged around the cavity 38 within the tubular body of the aerosol-generating device.

The flexible substrate 16 comprising the movable portion is arranged around the cavity 38 within the tubular body of the aerosol-generating device. In addition to heating the battery 12 when being in the near position, the heater is further configured for heating the aerosol-forming substrate of the aerosol-generating article 36 in one or both of the near position and the distanced position.

Figure 6:
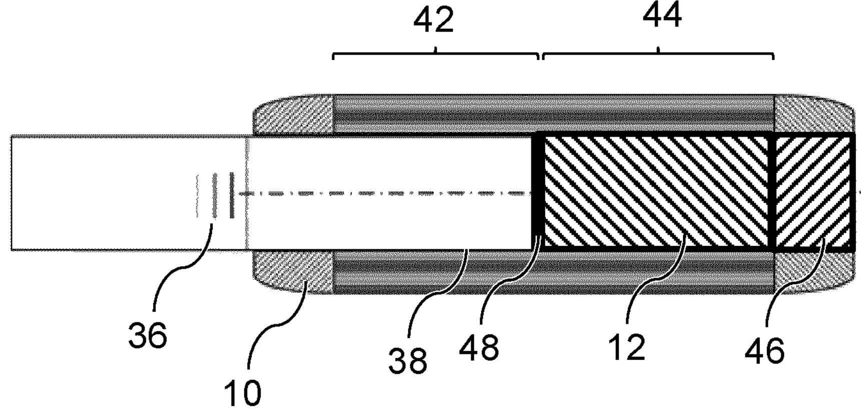
FIG. 6 shows an embodiment of an electronic device.

FIG. 6 shows an electronic device 10. The electronic device 10 is an aerosol-generating device. FIG. 6 shows an embodiment, in which the main power supply is a cylindrical battery 12. A proximal portion 42 of the cavity 38 is configured as a heating chamber for heating the aerosol-forming substrate of the aerosol-generating article 36. The battery 12 is arranged within a distal portion 44 of the cavity 38. A flexible substrate 16 is arranged around the cavity 38 within the tubular body of the aerosol-generating device. The heater 14 is movably mounted on a movable portion of the flexible substrate 16 such that the heater may be moved between a near position and a distanced position. In the near position, the heater 14 is arranged around the distal portion 44 and is configured for heating the battery 12. In the distanced position, the heater is arranged around the proximal portion 42 and is configured for heating the aerosol-forming substrate of the aerosol-generating article 36.

At the distal end of the device, an end wall 46 is provided. Between the aerosol-generating article 36 inserted into the cavity 38 and the battery 12, a sealing wall 48 is provided. The sealing wall 48 may prevent aerosol-forming substrate from the aerosol-generating article 36 to reach and contaminate the battery 12. Moreover, in case of a battery leakage, the sealing wall 48 may prevent contamination of the receiving cavity 38 with undesired chemical compounds. The sealing wall 48 may further act as thermal insulation.

The invention claimed is:

1. An aerosol-generating device, comprising:
- a battery, and
- a heater configured to heat the battery,
- wherein one or both of the battery and the heater are movably mounted in the aerosol-generating device, such that the battery and the heater are relatively movable towards each other between a near position and a distanced position, wherein the near position is different from the distanced position.

2. The aerosol-generating device according to claim 1, wherein the heater is further configured to perform at least one additional function in one or both of the near position and the distanced position.

3. The aerosol-generating device according to claim 2, wherein the at least one additional function is an additional heating function.

4. The aerosol-generating device according to claim 1, wherein the heater is further configured to heat an aerosol-generating article in one or both of the near position and the distanced position.

5. The aerosol-generating device according to claim 1, wherein one or both of the battery and the heater are mounted on a flexible substrate.

6. The aerosol-generating device according to claim 5, wherein one of the battery and the heater are mounted on a movable portion of the flexible substrate such that the battery and the heater are relatively movable towards each other by movement of the movable portion.

7. The aerosol-generating device according to claim 6, wherein the heater is an inductive heater comprising an induction coil and a susceptor.

8. The aerosol-generating device according to claim 7,
- wherein the battery is fixedly mounted to a body of the aerosol-generating device, and
- wherein one or both of the induction coil and the susceptor are mounted on the movable portion.

9. The aerosol-generating device according to claim 7,
- wherein the induction coil is fixedly mounted to a body of the aerosol-generating device,
- wherein the battery is mounted on the movable portion, and
- wherein the susceptor is mounted on the battery or the induction coil.

10. The aerosol-generating device according to claim 7,
- further comprising a heating chamber in thermal contact with an additional susceptor,
- wherein the heater is further configured to heat the heating chamber in the distanced position.

11. The aerosol-generating device according to claim 7,
- wherein the flexible substrate is in a form of a folded sheet, the folded sheet comprising a first layer overlying a second layer,
- wherein the first layer is fixedly mounted to a body of the aerosol-generating device, and
- wherein the second layer comprises the movable portion.

12. The aerosol-generating device according to claim 1, further comprising a temperature sensitive element configured to automatically relatively move the battery and the heater between the near position and the distanced position.

13. The aerosol-generating device according to claim 1, further comprising a timer configured to automatically relatively move the battery and the heater between the near position and the distanced position based on a preset time interval.

14. An aerosol-generating system comprising an aerosol-generating article and an aerosol-generating device according to claim 1.

15. A method for heating a battery in an aerosol-generating device, the method comprising steps of:
- providing the aerosol-generating device, comprising a battery and a heater configured to heat the battery, wherein one or both of the battery and the heater are movably mounted in the aerosol-generating device, such that the battery and the heater are relatively movable towards each other between a near position and a distanced position, wherein the near position is different from the distanced position; and relatively moving the battery towards the heater from the distanced position into the near position to heat the battery.

* * * * *